US007023916B1

(12) United States Patent
Pandel et al.

(10) Patent No.: US 7,023,916 B1
(45) Date of Patent: Apr. 4, 2006

(54) METHOD AND DEVICE FOR ESTIMATING MOTION IN A DIGITIZED IMAGE WITH PIXELS

(75) Inventors: Jürgen Pandel, Feldkirchen-Westerham (DE); Gero Bäse, München (DE); Norbert Örtel, München (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 09/762,408

(22) PCT Filed: Aug. 2, 1999

(86) PCT No.: PCT/DE99/02406

§ 371 (c)(1), (2), (4) Date: Jul. 9, 2001

(87) PCT Pub. No.: WO00/08601

PCT Pub. Date: Feb. 17, 2000

(30) Foreign Application Priority Data

Aug. 7, 1998 (DE) ................................ 198 35 845

(51) Int. Cl.
*H04N 7/12* (2006.01)

(52) U.S. Cl. ................................................ 375/240.03

(58) Field of Classification Search ........... 375/240.16, 375/240.03; H04N 7/12
See application file for complete search history.

(56) References Cited

U.S. PATENT DOCUMENTS

| | | | |
|---|---|---|---|
| 5,537,155 | A | 7/1996 | O'Connell et al. |
| 5,768,537 | A | 6/1998 | Butter et al. |
| 5,982,910 | A | 11/1999 | Drexler et al. |

FOREIGN PATENT DOCUMENTS

| | | | |
|---|---|---|---|
| DE | 37 33 038 C2 | 4/1989 |
| DE | 38 37 590 A1 | 5/1990 |
| DE | 195 09 418 A1 | 9/1996 |
| DE | 197 02 048 A1 | 8/1997 |
| DE | 196 33 581 C1 | 2/1998 |

OTHER PUBLICATIONS

ITU-T Draft Recommendation H.263, "Video Coding for Low Bitrate Communication", May 1996.

Oh, et al. "Block-matching algorithm based on dynamic adjustment of search window for low bit-rate video coding", J. of Electronic Imaging, Jul. 1998, vol. 7(3)/571.

*Primary Examiner*—Young Lee
(74) *Attorney, Agent, or Firm*—Peter F. Corless; Steven M. Jensen; Edwards Angell Palmer & Dodge LLP

(57) ABSTRACT

A method and arrangement are provided for motion estimation in a digitized picture having pixels, the pixels being grouped into picture blocks. The pixels can be grouped into at least a first picture area and a second picture area. First motion estimation is carried out in a first search area in order to determine a first motion vector. Furthermore, second motion estimation is carried out in a second search area in order to determine a second motion vector. The first search area and the second search area are of different sizes.

8 Claims, 3 Drawing Sheets

METHOD AND DEVICE FOR ESTIMATING MOTION IN A DIGITIZED IMAGE WITH PIXELS

The invention relates to motion estimation in a digitized picture having pixels.

Such a method is known from [1].

In the method for motion estimation from [1], pixels of a digitized block for which the motion estimation is intended to be carried out are grouped into picture blocks.

For each picture block in the picture, an attempt is made within a search area whose size can be preset to determine an area of the size of the picture block in which the similarity of the coding information which is contained in the picture block for which the motion estimation is being carried out matches as well as possible.

In the following text, the term coding information means brightness information (luminance values) or color information (chrominance values) which are each associated with a pixel.

For this purpose, in a preceding picture and based on the position in which the picture block is located in the preceding picture, a region of the corresponding block size with the same number of pixels as those contained in the picture block is in each case formed for each position in an area whose size (search area) can be predetermined, and the sum of the square or absolute difference of the coding information is formed between the picture block for which the motion estimation is intended to be carried out and the respective region in the preceding picture. The region which matches best, that is to say has the minimum sum value, is regarded as the matching picture block and the movement in the position of the picture block between the "best" region in the preceding picture and that picture block is determined. This movement is referred to as the motion vector.

The document Oh et al "Block-matching algorithm based on dynamic adjustment of search window for low bit-rate video coding", Journal of Electronic Imaging, US, Volume 7, No. 3, July 1998, pages 571–577 describes a method for motion estimation of objects in a video sequence using a block matching algorithm, and the use of the motion vectors determined by means of this method for compression of the video data. For estimation of the motion vectors, the individual video pictures are broken down into blocks of N×N pixels. For each picture block in the current video picture, the associated, best-matching picture block in a preceding reference video picture is determined, and the sought motion vector for this picture block is determined from the difference in the position of the block in the two video pictures. The method in this case uses a search area of variable size, in which matching picture blocks are looked for within the reference video picture.

The document U.S. Pat. No. 5,537,155 describes a method for video compression, in which motion estimation is carried out between the individual pictures in a video sequence. Motion estimation is carried out using a block matching algorithm in which the picture blocks in the present video picture are compared with picture blocks from a preceding video picture. This comparison is carried out with a respectively different step width in different search areas. The search is carried out with a small step width around the position of the present picture block in a first search area within the comparison picture. Searches are then carried out with correspondingly larger step widths in larger areas around the present picture block.

When the corresponding video block in the comparison picture is found, this thus defines the motion vector for this block, which is then used for coding that video block.

The invention is based on the problem of providing a method and an apparatus for motion estimation in which the total number of bits required overall for coding the motion vectors is reduced.

The problem is solved by the method and by the arrangement according to the features of the independent patent claims.

In the case of the method for motion estimation of a digitized picture having pixels, the pixels are grouped into picture blocks. The pixels are grouped at least into a first picture area and a second picture area. First motion estimation is carried out in a first search area for at least a first picture block in the first picture area in order to determine a first motion vector by means of which a movement of the first picture block is described in comparison to the first picture block in a preceding predecessor picture, and/or in comparison to the first picture block in a subsequent successor picture. Furthermore, second motion estimation is carried out in a second search area for at least one second picture block in the second picture area in order to determine a second motion vector by means of which a movement of the second picture block is described in comparison to the second picture block in a preceding predecessor picture and/or in comparison to the second picture block in a subsequent successor picture. The first search area and the second search area are in this case of different sizes.

The arrangement for motion estimation of a digitized picture having pixels has a processor which is set up such that the following steps can be carried out:

- the pixels are grouped into picture blocks,
- the pixels are grouped to form at least one first picture area and one second picture area,
- first motion estimation is carried out in a first search area for at least one first picture block in the first picture area in order to determine a first motion vector by means of which a movement of the first picture block is described in comparison to the first picture block in a preceding predecessor picture and/or in comparison to the first picture block in a subsequent successor picture,
- second motion estimation is carried out in a second search area for at least one second picture block in the second picture area in order to determine a second motion vector by means of which a movement of the second picture block is described in comparison to the second picture block in a preceding predecessor picture and/or in comparison to the second picture block in a subsequent successor picture, and
- the first search area and the second search area are of different sizes.

The invention makes it possible to reduce the required data rate for transmission of compressed video data, since the size of the motion vectors can be adaptively matched to qualitative requirements and thus, without noticeably detracting from the subjective impression of the quality of a picture, only a very small search area is provided even, for example, in regions in which only low quality is required. The maximum size of a motion vector in this search area is thus relatively small, which results in the number of bits for coding the motion vector being reduced.

The invention can evidently be seen in the fact that search areas of different size are used for picture areas for motion estimation of the picture blocks in the picture areas, which results in flexible reduction, matched to the quality, of the required data rate for coding for motion vectors.

Advantageous developments of the invention result from the dependent claims.

One development provides for the size of the first search area and/or of the second search area to be varied as a function of a predetermined picture quality, by means of which the first picture block and/or the second picture block are/is coded.

In this way, a measure for limiting the search areas is specified, which allows a reduction in the required data rate taking account of the required picture quality.

One extremely simple criterion for determining the size of the respective search area, in one development, is a quantization parameter by means of which the first picture block and/or the second picture block are/is quantized.

A further refinement provides for a number of tables, in which codes for variable length coding are stored, to be used for variable length coding of the motion vectors, and this results in a further reduction in the required data rate for transmission of the video data.

An exemplary embodiment of the invention will be explained in more detail in the following text and is illustrated in the figures, in which:

FIGS. 1*a* to 1*c* show a sketch of a picture and of a preceding picture, in which the principle on which the invention is based is illustrated;

FIG. 2 shows an arrangement which comprises two computers 202, 208 and a camera 201, showing picture coding, transmission of the video data, and picture decoding.

Figure 1A:
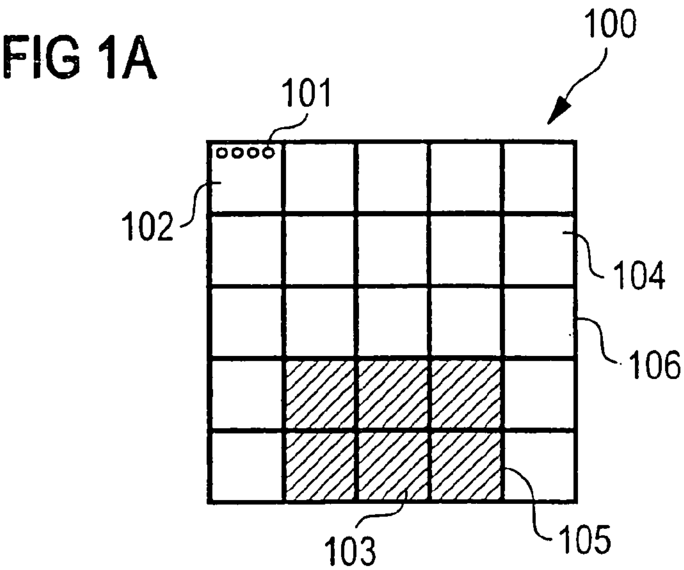

A camera 201 is connected to a first computer 202 via a line 219. The camera 201 transmits pictures 204 it has filmed to the first computer 202. The first computer 202 has a first processor 203 which is connected via a bus 218 to a frame memory 205. A method for picture coding is carried out by the first processor 203 in the first computer 202. In this way, coded video data 206 are transmitted from the first computer 202 via a communications link 207, preferably a cable or a radio path, to a second computer 208. The second computer 208 contains a second processor 209, which is connected to a frame memory 211 via a bus 210. A method for picture decoding is carried out by means of the second processor 209.

Both the first computer 202 and the second computer 208 have a respective screen 212 or 213, on which the video data 204 are displayed. Input units, preferably a keyboard 214 or 215 and a computer mouse 216 or 217, are respectively provided for both the first computer 202 and the second computer 208.

The video data 204 which are transmitted from the camera 201 via the line 219 to the first computer 202 are data in the time domain, while the data 206 which are transmitted from the first computer 202 to the second computer 208 via the communications link 207 are video data in the spectral domain.

The decoded video data are displayed on a screen 213.

Figure 3:
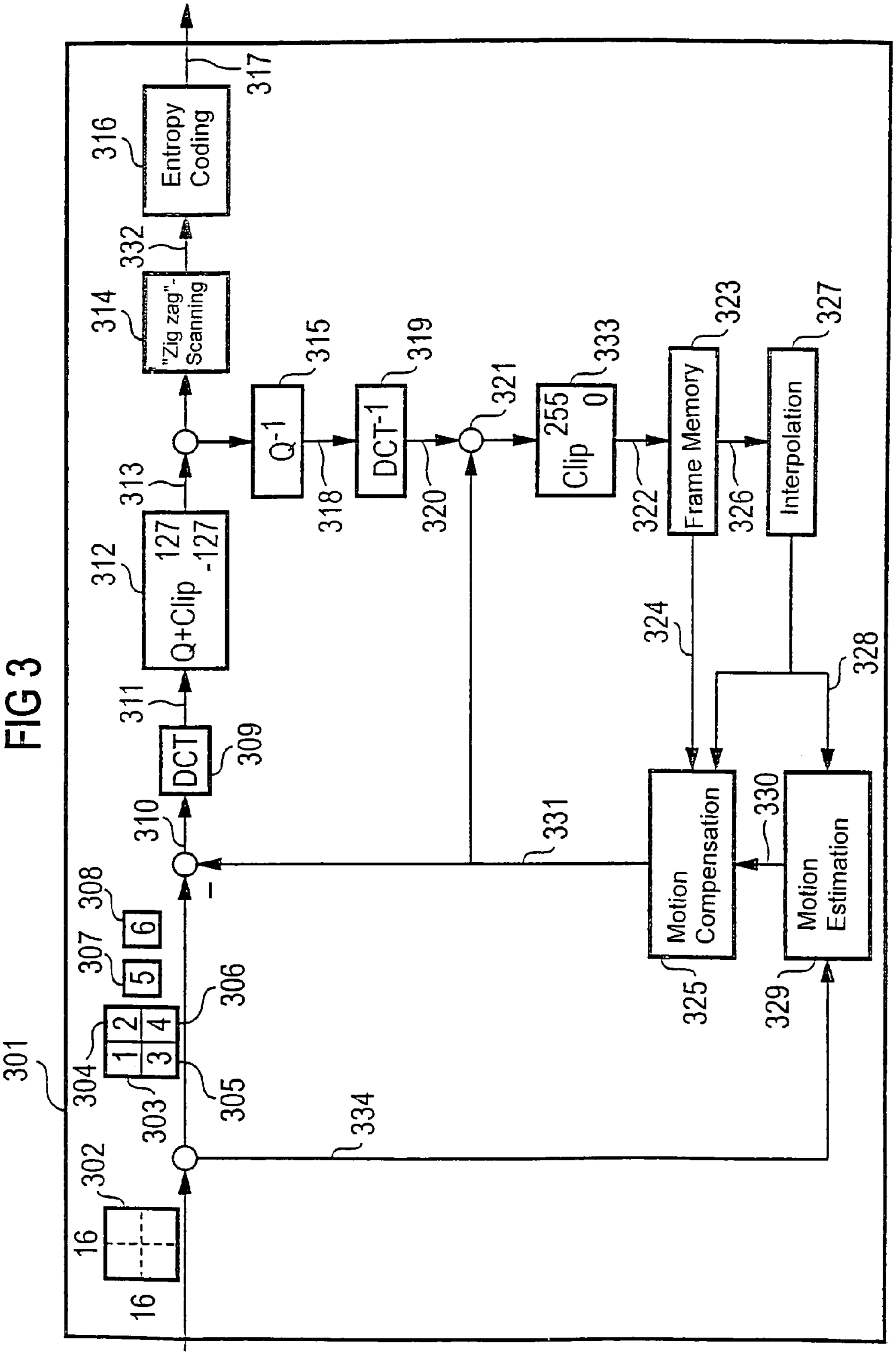
FIG. 3 shows a sketch of an apparatus for block-based coding of a digitized picture.

FIG. 3 shows a sketch of an arrangement for carrying out a block-based picture coding method in accordance with the H.263 Standard (see [5]).

A video data stream to be coded and having successive digitized pictures is supplied to a picture coding unit 301. The digitized pictures are subdivided into macro blocks 302, with each macro block containing 16×16 pixels. The macro block 302 comprises four picture blocks 303, 304, 305 and 306, with each picture block containing 8×8 pixels, to which luminance values (brightness values) are assigned. Furthermore, each macro block 302 comprises two chrominance blocks 307 and 308 having the chrominance values assigned to the pixels (color information, color saturation).

The block in a picture contains a luminance value (=brightness), a first chrominance value and a second chrominance value. In this case, the luminance value, the first chrominance value and the second chrominance value are referred to as color values.

The picture blocks are supplied to a transformation coding unit 309. During difference-picture coding, the values to be coded from picture blocks from preceding pictures are subtracted from the picture blocks to be coded at that time, and only the difference-forming information 310 is supplied to the transformation coding unit (Discrete Cosine Transformation, DCT) 309. For this purpose, the present macro block 302 is signaled to a motion estimation unit 329 via a link 334. In the transformation coding unit 309, spectral coefficients 311 are formed for the picture blocks or difference picture blocks to be coded, and are supplied to a quantization unit 312.

Quantized spectral coefficients 313 are supplied both to a scanning unit 314 and to an inverse quantization 315 in a feedback path. Using a scanning method, for example a "zigzag" scanning method, entropy coding is carried out on the scanned spectral coefficients 332 in an entropy coding unit 316 provided for this purpose. The entropy-coded spectral coefficients are transmitted as coded video data 317 via a channel, preferably a cable or a radio path, to a decoder.

Inverse quantization of the quantized spectral coefficients 313 is carried out in the inverse quantization unit 315. Spectral coefficients 318 obtained in this way are supplied to an inverse transformation coding unit 319 (Inverse Discrete Cosine Transformation, IDCT). Reconstructed coding values (and difference coding values) 320 are supplied to an adder 321 in the difference-forming mode. The adder 321 also receives coding values for a picture block, which are obtained from a preceding picture once motion compensation has already been carried out. The adder 321 is used to form reconstructed picture blocks 322, which are stored in a frame memory 323.

Chrominance values 324 of the reconstructed picture blocks 322 are supplied from the frame memory 323 to a motion compensation unit 325. For brightness values 326, interpolation is carried out in an interpolation unit 327 provided for this purpose. The interpolation is preferably used to quadruple the number of brightness values contained in the respective picture block. All the brightness values 328 are supplied not only to the motion compensation unit 325 but also to the motion estimation unit 329. The motion estimation unit 329 also receives the picture blocks for the respective macro block (16×16 pixels) to be coded, via the link 334. Motion estimation is carried out in the motion estimation unit 329, taking account of the interpolated brightness values ("motion estimation on a half-pixel basis").

The result of the motion estimation is a motion vector 330 which expresses a movement in the position of the selected macro block from the preceding picture to the macro block 302 to be coded.

Both brightness information and chrominance information relating to the macro block determined by the motion estimation unit 329 are shifted through the motion vector 330, and are subtracted from the coding values of the macro block 302 (see data path 231).

The motion estimation thus results in the motion vector 330 with two motion vector components, a first motion vector component $BV_x$ and a second motion vector component $BV_y$ along the first direction x and the second direction y:

$$BV = \begin{pmatrix} BV_x \\ BV_y \end{pmatrix}$$

The motion vector 330 is assigned to the picture block.

The picture coding unit shown in FIG. 3 thus provides a motion vector 330 for all the picture blocks and macro picture blocks.

FIG. 1*a* shows a digitized picture 100 which is intended to be coded using the apparatus illustrated in FIG. 3.

The digitized picture 100 has pixels 101 to which coding information is assigned.

The pixels 101 are grouped into picture blocks 102. The picture blocks 102 are grouped into a first picture area 105 and into a second picture area 106.

In the following text, it is assumed that the quality requirements in the first picture area 105 are more stringent than the requirements for the quality in the second picture area 106.

Motion estimation is carried out for a first picture block 103 in the first picture area 105. To this end, a first search area 114 is defined in a preceding picture and/or in a subsequent picture 110.

Based on a starting region 113 whose shape and size are the same as those of the first picture block, the following error E is in each case determined, shifted by one pixel or by a fraction or a multiple of the pixel separation (for example by half a pixel (half-pixel motion estimation)) through which the start region 113 is in each case shifted:

$$E = \sum_{i=1}^{n} \sum_{j=1}^{m} (x_{i,j} - y_{i,j})^2,$$

Where i,j are sequential indices, n is the number of pixels in the first picture block along a first direction, m is the number of pixels in the first picture block along a second direction, $x_{i,j}$ is coding information for the pixel at the position i,j within the first picture block, $y_{i,j}$ is coding information for the pixel at the corresponding point in the previous picture, shifted through the corresponding motion vector.

The error E is calculated for each shift in the previous picture 110 and the picture block from that shift (=motion vector) whose error E has the lowest value is selected as that which is most similar to the first picture block 103.

Figure 1B:
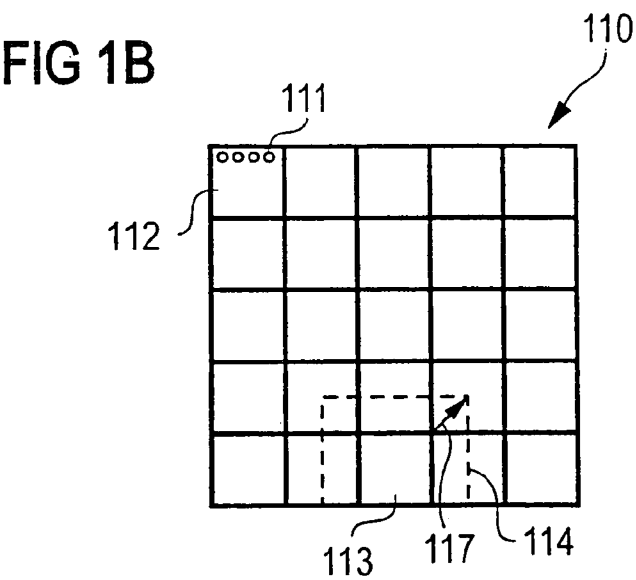

In this exemplary embodiment, the search area in each case covers four pixel intervals, both in the horizontal direction and in the vertical direction, about a start position 113 which corresponds to the relative position of the first picture block of the first picture area in the preceding picture 110. The maximum size of a first motion vector 117 to be coded is thus $4\sqrt{2}$ pixel intervals in this case (see FIG. 1*b*).

Figure 1C:
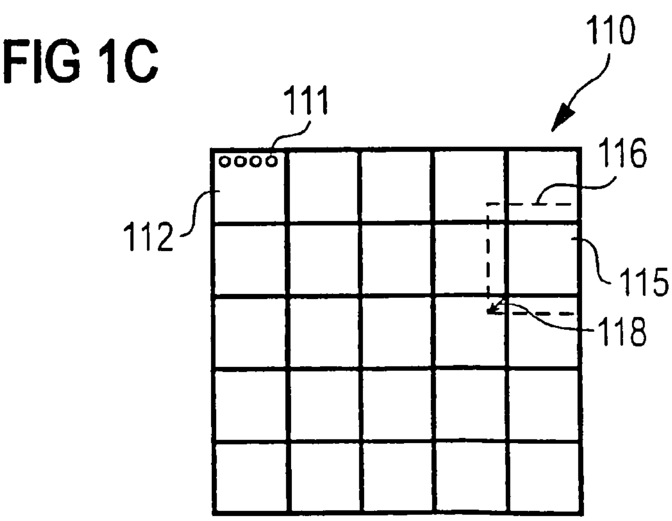
Figure 2:
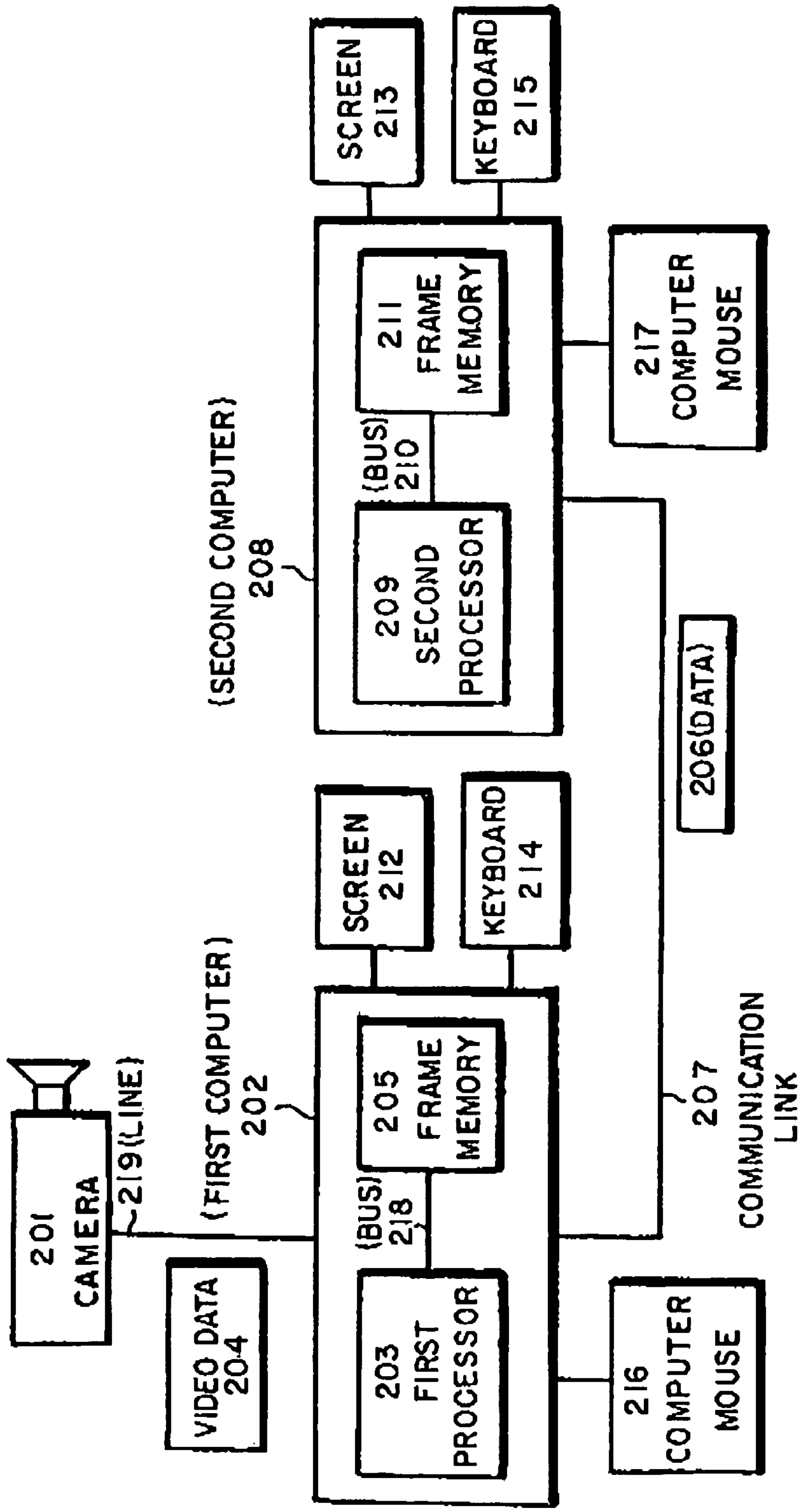
FIG. 2 shows an arrangement of two computers, a camera and a screen, by means of which the video data are coded, transmitted, decoded and displayed.

FIG. 1*c* shows second motion estimation for a second picture block 104 in the second picture area 106. The fundamental procedure for the purposes of motion estimation is also described as above for the second motion estimation.

For the second motion estimation, a second search area 116 is smaller, since the requirements for the picture quality in the second picture area 106 are not as stringent as those for the first picture area 105.

For this reason, the size of the second search area 116 is only two pixels 116 in each direction, originating from a start position 115. The maximum size of a second motion vector 118 to be coded for the second picture block 104 is thus $2\sqrt{2}$.

It can be seen from this example that considerably less computation effort is required for coding the second motion vector 118 than for coding the first motion vector 117.

Based on this illustrative example, the size of a search area for a picture block in the exemplary embodiment is dependent on a quantization parameter which indicates the quantization steps which were used to code the preceding picture 100.

The size S of a search area is obtained using the following rule:

$$S=15-QP/2$$

where

S is the size of the search area, and

QP is the quantization parameter.

The quantization parameter QP is a factor contained in the normal header data for H.263, and is used as the start value for the quantization.

The size S of the search area for a picture block thus becomes larger the smaller the quantization parameter QP, which corresponds to high picture quality.

A number of tables, which contain different codes for motion vectors of different length with a different value range, are used for variable length coding of the motion vectors.

The quantization parameter QP is used to select that table for variable length coding whose table entries for the variable length codes have a value range which is matched to the size S of the search area, and thus to the maximum length of the motion vector.

A number of alternatives to the exemplary embodiment described above are explained below.

The type of motion estimation, and thus the way in which the similarity measure is formed, are irrelevant to the invention.

Thus, for example, the following rule can also be used to form the error E:

$$E = \sum_{i=1}^{n} \sum_{j=1}^{m} |x_{i,j} - y_{i,j}|.$$

It has furthermore been shown that, for further reduction of the required data rate, it is in many cases even sufficient to transmit only the motion vectors without also transmitting an error signal which is produced during the formation of the difference pictures for motion compensation.

The invention can evidently be seen in the fact that search areas of different size are used for picture areas for motion estimation of the picture blocks in the picture areas, which results in a flexible reduction, matched to the quality, in the required data rate for coding of the motion vectors.

The following publication is cited in this document:

[1] ITU-T Draft Recommendation H.263, Video Coding for Low Bitrate Communication, May, 1996.

What is claimed is:

1. A method for motion estimation in a digitized image having pixels, comprising:

grouping pixels in picture blocks, in which the pixels are grouped to form at least one first picture area and one second picture area;

wherein first motion estimation is carried out in a first search area for at least one first picture block in the first picture area to determine a first motion vector whereby movement of the first picture block is described in comparison to the first picture block in a preceding picture and/or in comparison to the first picture block in a subsequent picture;

wherein second motion estimation is carried out in a second search area for at least one second picture block in the second search area to determine a second motion vector whereby movement of the second picture block is described in comparison to the second picture block in a preceding picture and/or in comparison to the second picture block in a subsequent picture;

wherein the first search area and the second search area are of different sizes; and wherein the size of the first search area and/or of the second search area is varied as a function of a predetermined picture quality measured by quantization parameter that indicates quantization steps used to code the preceding picture such that if the quantization parameter of the first picture block is smaller than the quantization parameter of the second picture block, then the size of the first search area is larger than the size of the second search area, whereas if the quantization parameter of the first picture block is larger than the quantization parameter of the second picture block, then the size of the first search area is smaller than the size of the second search area, such that a higher quantization parameter indicates a lower picture quality.

2. The method of claim 1 used for coding the digitized image.

3. The method of claim 2 wherein variable length coding of the motion vectors is carried out; and a number of stored, different tables, in which codes for variable length coding are stored, are used for variable length coding.

4. The method of claim 3 wherein the tables are matched to the maximum length of the motion vectors.

5. An arrangement for motion estimation in a digitized image having pixels, comprising:

a processor which is set up such that the following steps can be carried out:

the pixels are grouped in picture-blocks;

the pixels are grouped to form at least one first picture area and one second picture area;

first motion estimation is carried out in a first search area for at least one first picture block in the first picture area to determine a first motion vector whereby movement of the first picture block is described in comparison to the first picture block in a preceding picture and/or in comparison to the first picture block in a subsequent picture;

second motion estimation is carried out in a second search area for at least one second picture block in the second search area to determine a second motion vector whereby movement of the second picture block is described in comparison to the second picture block in a preceding picture and/or in comparison to the second picture block in a subsequent picture;

in which the first search area and the second search area are of different sizes; and in which the size of the first search area and/or of the second search area is varied as a function of a predetermined picture quality measured by quantization parameter that indicates quantization steps used to code the preceding picture such that if the quantization parameter of the first picture block is smaller than the quantization parameter of the second picture block, then the size of the first search area is larger than the size of the second search area, whereas if the quantization parameter of the first picture block is larger than the picture quantization parameter of the second picture block, then the size of the first search area is smaller than the size of the second search area, such that a higher quantization parameter indicates a lower picture quality.

6. The arrangement of claim 5 used in a picture coding device.

7. The arrangement of claim 5, used in a picture coding device, wherein the processor is set up such that, variable length coding of the motion vectors is carried out; and a number of stored, different tables, in which codes for variable length coding are stored, are used for variable length coding.

8. The arrangement of claim 7 wherein the processor is set up such that the tables are matched to the maximum length of the motion vectors.

* * * * *